Patented Feb. 13, 1923.

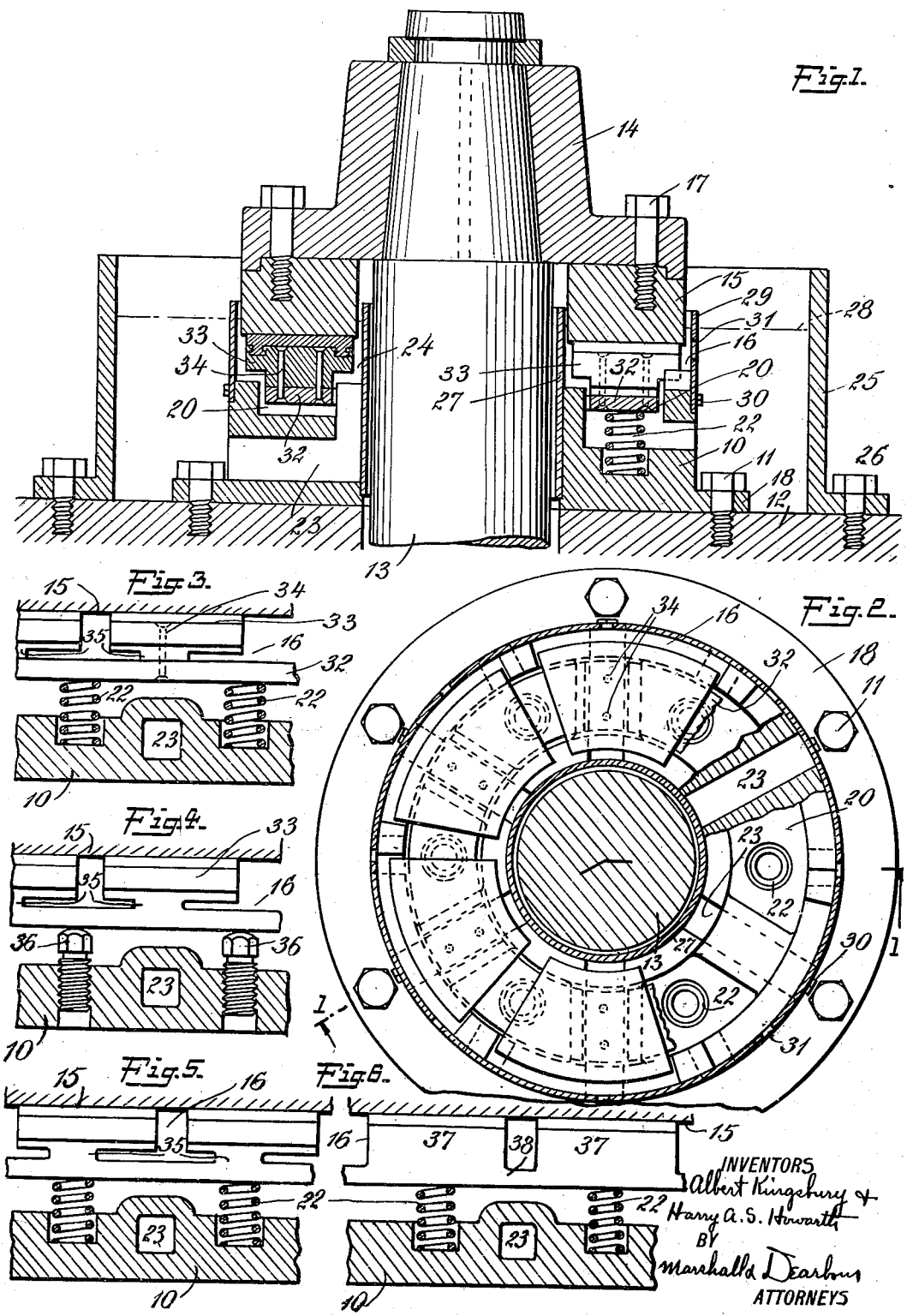

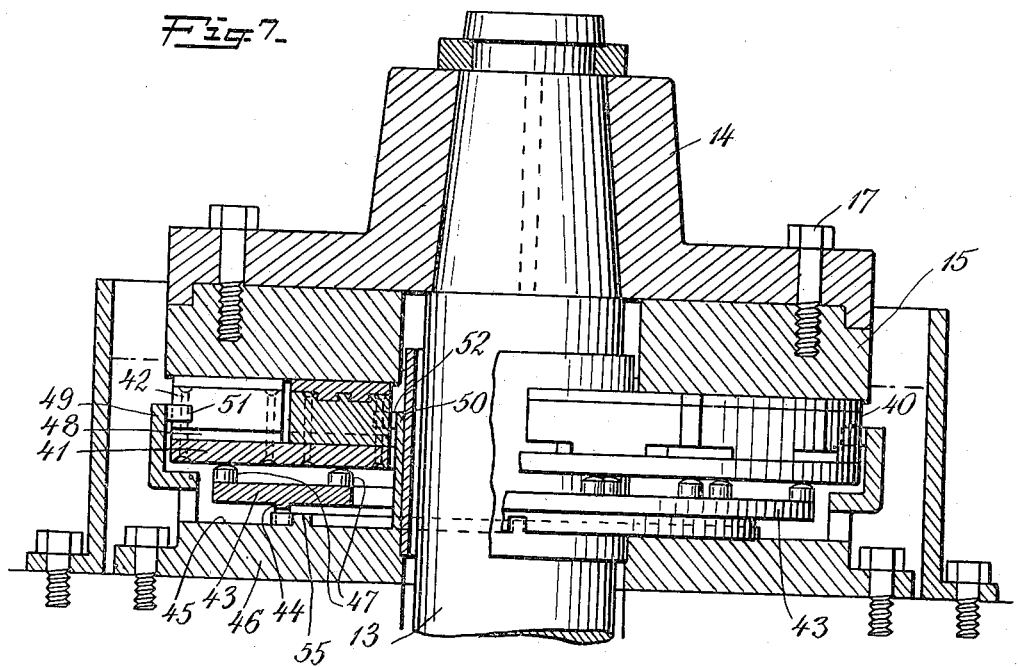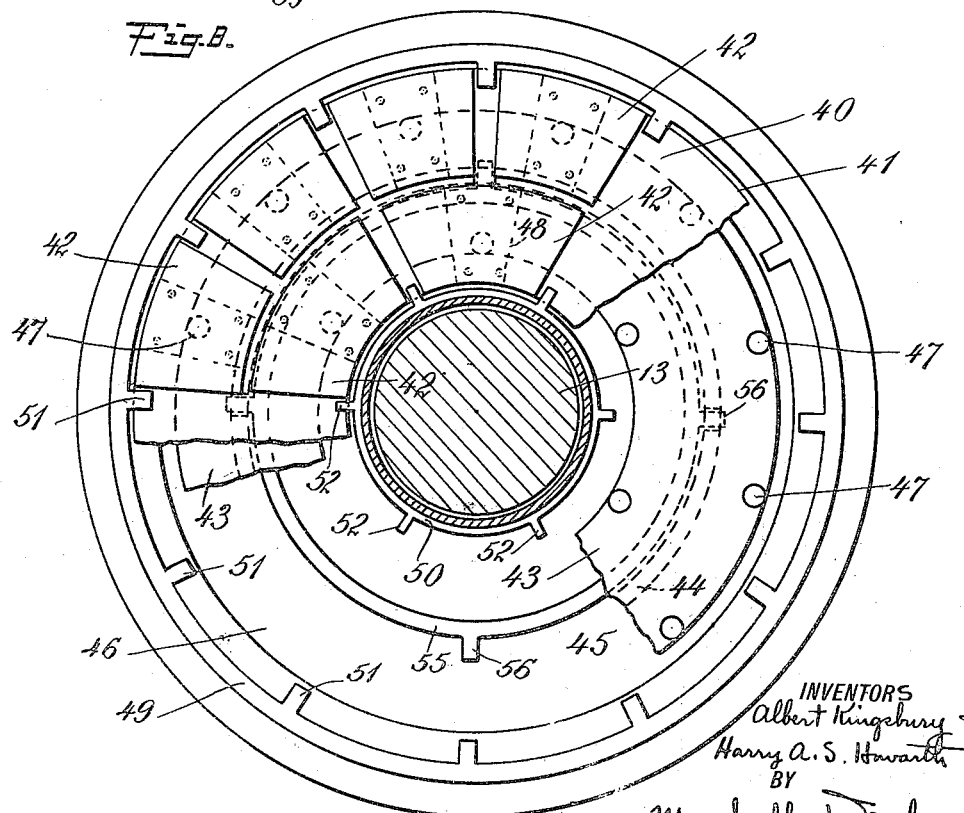

1,444,841

UNITED STATES PATENT OFFICE.

ALBERT KINGSBURY AND HARRY A. S. HOWARTH, OF PITTSBURGH, PENNSYLVANIA; SAID HOWARTH ASSIGNOR TO SAID KINGSBURY.

BEARING.

Original application filed April 5, 1916, Serial No. 89,001. Divided and this application filed May 17, 1918. Serial No. 235,063.

*To all whom it may concern:*

Be it known that we, ALBERT KINGSBURY, a citizen of the United States of America, and a resident of Pittsburgh, Allegheny County, and State of Pennsylvania, and HARRY A. S. HOWARTH, a citizen of the United States, and a resident of Pittsburgh, Allegheny County, and State of Pennsylvania, have invented certain new and useful Improvements in Bearings, of which the following is a specification, reference being had to the accompanying drawings, forming a part thereof.

Our invention relates to bearings, and particularly to thrust or foot-step bearings, of the flexible or tiltable segment bearing type which are adapted to automatically maintain a film of lubricating fluid between the bearing surfaces in accordance with the principles disclosed in Kingsbury Patent No. 947,242. More specifically stated, our invention consists in specific improvements in that class of Kingsbury flexible shoe bearings, which are described in Kingsbury Patent No. 1,117,499 and which comprise a series of resilient supports, for the tiltable bearing segments, so arranged and disposed as to permit the said segments to rock or flex both tangentially and radially, and also serving to automatically equalize, or equitably distribute, the thrust pressures over the entire surface of bearing engagement.

This application is in part a division of our co-pending application S #89,001 filed April 5, 1916,—in which we have disclosed and claimed a bearing of the above specified character comprising a unitary flexible segment bearing member so constructed and supported as to permit the shoe or segment portions to yield or flex in the desired manner by reason of the elasticity or resiliency of the parts—and in part a continuation of another copending application S. #156,546, filed March 22, 1917 as a division of our parent application S. #89,001.

One object of our invention is to provide a unitary bearing ring having bearing shoes or relatively rigid bearing sectors and flexible interconnecting portions,—arranged to permit the shoes to tilt tangentially in response to the action of the oil when the bearing is in operation, and radially if necessary, in order to equalize the pressure on the circumferential zones of the individual shoe surfaces,—in combination with means for automatically equalizing or equitably distributing the load on the several shoes. Another object is to provide, in combination with a flexible bearing member of the aforesaid character, a series of resilient equalizer supports adapted to increase the elasticity of the structure as a whole and thereby assist in the more rapid and perfect equalization or distribution of the thrust pressures on the entire series of segmental bearing surfaces.

In order that our invention may be thoroughly understood we will now proceed to describe the same in the following specification, and will then point out the novel features thereof in appended claims. The invention is capable of receiving a variety of mechanical expressions some of which are shown on the accompanying drawings, but it is to be expressly understood that the drawings are for purposes of illustration only, and are not to be construed as a definition of the limits of the invention, reference being had to the appended claims for that purpose.

Referring to the drawings:

Figure 1 is a sectional elevation, taken on the line 1—1 of Figure 2, of a thrust bearing constituting one embodiment of our invention.

Figure 2 is a sectional plan view of the same bearing, with certain of the parts broken away to disclose the supports and the associated parts.

Figure 3 is a sectional view developed into a single plane and showing a portion of the bearing member in elevation.

Figures 4, 5 and 6 are views, corresponding to Figure 3, of other structures which also embody our invention.

Figure 7 is a partially sectional elevation of another structure which embodies our invention and which comprises a bearing member supported on a single resilient equalizing carrier.

A plan view of the same structure, with certain of the parts broken away, is shown in Figure 8.

In the form shown in Figures 1 and 2, the structure comprises a base 10 secured by bolts 11 or other suitable means to a frame or foundation 12, a shaft 13 which extends through suitable openings in the frame and base, a thrust block 14 on the shaft and bearing members 15 and 16.

The thrust block 14 is keyed or affixed to the shaft 13 by any suitable means and one of the bearing members 15, hereinafter designated the thrust collar, is secured to the block 14 by bolts 17 or other suitable means.

The base 10 has a flange 18 through which the bolts 11 extend and it is provided in the form illustrated with an annular groove 20 near its upper surface. Lubricating passages 23 are provided in the base and extend readily inward and axially upward through it—as shown in Figure 1—to the annular space 24 within the bearing members.

An outer wall or flange 25 surrounds the bearing and is suitably secured to the frame or foundation 12 as by bolts 26, and a sleeve 27 is attached to the base 10 and loosely surrounds the shaft 13 so that it cooperates with the wall 25 in providing a fluid containing reservoir 28. We also prefer to utilize a baffle plate 29 which has the form of a sleeve secured to the base by bolts 30 and which extends upwardly from the base beyond the plane of the bearing surfaces and is perforated opposite the bearing surfaces as indicated at 31.

The bearing member 16, with which the present invention is more particularly concerned, is composed, in the form shown in Figure 3, of a resilient ring 32, which is mounted in the annular groove 20 of the base and rests upon springs 22, and a plurality of shoes 33 which are attached to the resilient ring 32—by rivets 34 or some other suitable means—as to form therewith a substantially unitary structure.

The shoes 33 in the form illustrated are each provided with a projection or rib 35 which extends radially across the bottom of the shoe and engages the adjacent surface of the ring 32 so that it serves to space the body of the shoe from the ring. The projection or rib 35 may be located in the center of the bottom of the shoe or may be offset to one side of the center as shown in Figure 3. We consider the offset arrangement the most desirable when the bearing is intended to rotate in only one direction, but the rib is preferably located in the center when the bearing is designed to rotate in either direction.

It is evident that the bearing member 16 which is composed of the resilient ring 32 and the attached shoes 33 acts as a unitary structure, and may be formed in one integral piece, as shown, for example, in Figures 4 and 5.

The springs may be arranged as shown in Figure 5, so that each spring is directly under one of the ribs 35 which joins the shoe to the ring; or they may engage the ring 32 at points between the shoes and thereby increase the elasticity of the structure on account of the flexibility of the ring. If the ring supports are arranged in the last described manner, the automatic equalization of the pressure on the shoes may be obtained by the use of relatively rigid projections or adjusting screws 36 as shown in Figure 4. In this case the resiliency or elasticity of the ring alone is depended upon—in conjunction with the non-automatic adjustment of the screws—to equitably distribute the load on the annular series of bearing segments.

As shown in Figure 6 the shoe portions of the bearing ring are not necessarily T-shaped but may have the form of sector-shaped blocks 37 mounted on the resilient ring 32 or joined by flexible webs 38 which may be integral with or suitably attached to said blocks.

In the construction shown in Figures 7 and 8, the thrust collar 15, instead of cooperating with the member 16, cooperates with a member 40 which is composed of a flexible ring 41—corresponding to the ring 32—and bearing shoes 42, which correspond to the shoes 33. The shoes 42 however are arranged in two concentric rows, the arrangement being specially designed for very heavy loads. Each of the shoes is attached to the ring 41 in substantially the same manner as the shoes 33 are attached to the ring 32; but there are preferably twice as many shoes in the outer row as in the inner row, so that a radial line extending through the supporting rib of one of the shoes of the inner row extends between adjacent shoes of the outer row, as shown in both Figures 7 and 8.

The member 40, instead of being comprised of a flexible ring and attached shoes, may be made in one integral piece, and in any event it constitutes a unitary structure—which corresponds to the unitary structure 16—and may have the shoes 42 arranged thereon as shown in Figures 4, 5 or 6, or in any other suitable manner.

The member 40 is mounted on and supported by a resilient equalizing ring 43 having a central annular rib or projection 44 which reacts upon the top surface 45 of a base 46. This equalizing ring is formed of an elastic material and constitutes a readily flexible spring support, and may be dished or distorted from a plane ring to a frusto-conical member of low altitude by reason of the position of the rib 44 which constitutes an annular axis about which the distortion may take place.

Upon the upper surface of the resilient equalizing ring 43 are a plurality of projections 47 having spherically curved top surfaces upon which the flexible ring 41 of the bearing member 40 is mounted. As shown in Figures 7 and 8, these projections engage the ring directly below the ribs 48 of the shoes; but they may also be so located as to engage the flexible ring 41 between the shoes if desired, thereby still further increasing the flexibility of the structure.

The equalizer 43 is held in position and prevented from rotating by a rib 55 on the base which cooperates with rib 44 of the equalizer and is provided with one or more lateral projections or lugs 56 which extend through notches in the rib 44.

As clearly shown in Figure 8, the stationary base 46 has annular projections 49 and 50 from which project lugs 51 and 52. These lugs are located and spaced so as to extend between the shoes of the respective rows, and thus prevent their rotation. In place of this arrangement the ring 41 may of course be held against rotation in any other suitable manner, and it is obviously not essential to have means for holding the shoes individually provided the shoes are affixed to the ring.

While we have shown the bearing member which comprises the flexible portion and the shoe portions as a part of the stationary elements of the bearing, it is obvious that this flexible ring-shoe member may, if desired, be made a part of the rotating elements, in which case the thrust collar 15 would be mounted as part of the stator instead of being mounted as part of the rotor.

In all of the constructions hereinbefore described the construction and arrangement of the flexible ring-shoe member—and the supporting means therefor—is such that the individual shoes or bearing segments are permitted to yield or tilt tangentially—to form the wedge-shaped oil films between the bearing surfaces—by reason of the longitudinal elasticity of the parts, and the parts of the ring-shoe member may flex or twist radially or transversely so as to equalize the load pressures and the bearing engagement over the concentric circumferential zones of the bearing surfaces; and is further such that the said load pressure may be equitably distributed circumferentially on the annularly arranged series of bearing segments either by the longitudinal yielding of the shoe supporting ring alone, or by the joint and cooperative flexing of the said ring and the resilient mounting therefor. In the case of the particular structure shown in Figures 7 and 8, the resilient ring support 43 also performs the additional function of equalizing or equitably distributing the total or aggregate pressures between the two concentric sets or rows of shoes which constitute the complete group of flexible bearing segments.

Structures of preferred form and construction have been illustrated and described for the purpose of showing ways in which this invention may be embodied, but the inventive thought upon which this application is based is broader than these illustrative embodiments thereof, and I therefore intend no limitations other than those imposed by the appended claims.

What we claim is:

1. In a bearing, the combination of a bearing member comprising a plurality of relatively-rigid segmental bearing portions with interposed resilient connecting portions, and a series of separated elastic supports for the said bearing portions.

2. In a bearing, the combination of a bearing member comprising a plurality of relatively rigid bearing portions with interposed resilient connecting portions, and circumferentially spaced resilient supports for the bearing member arranged to automatically effect the equalization of the load on the bearing surfaces.

3. In a bearing, the combination of a bearing member comprising a plurality of relatively rigid bearing segments with interposed resilient connecting portions, and a plurality of resilient members for supporting the bearing member to permit the tangential tilting of the bearing segments and to also automatically effect the equalization of the load thereon.

4. In a bearing, the combination of a bearing member comprising a plurality of relatively rigid portions constituting an annular series of segmental bearing surfaces with interposed resilient connecting portions, and a series of spaced yieldable supports adapted to permit of the elastic yielding of the resilient connecting portions.

5. A bearing comprising a base, a bearing member consisting of a resilient ring portion with a series of substantially T-shaped shoes secured thereon, and spaced resilient means interposed between the base and the adjacent face of the bearing member and adapted to effect the automatic equalization of the load on the bearing surfaces.

6. In a bearing, the combination of a flexibly connected series of relatively rigid segmental bearing portions, and a plurality of resilient members for supporting the same.

7. In a bearing, the combination of a flexibly connected series of relatively-rigid bearing segments, and a plurality of resilient members engaging the said connected segments at a series of distributed points for yieldingly supporting the same and equitably distributing the pressure on said elements.

8. In a bearing, the combination of a bearing member comprising a flexibly connected plurality of relatively rigid bearing segments, and a series of springs on which the said member is supported.

9. In a bearing, the combination of a bearing member comprising a flexibly connected series of relatively rigid bearing segments, and a series of circumferentially distributed springs for yieldingly supporting the bearing member and thereby automatically effecting the equalization of the pressure on the bearing surfaces.

10. In a bearing, the combination of a bearing member comprising a plurality of bearing segments and resilient connecting portions, and means for supporting the bearing member only at the resilient connecting portions.

11. In a bearing, the combination of a bearing member comprising a plurality of bearing segments and flexible connecting portions, and resilient means for supporting the bearing member only at the flexible connecting portions.

12. In a bearing, the combination of a bearing member comprising a plurality of bearing segments and flexible connecting portions, and a series of springs for supporting the bearing member only at the flexible connecting portions.

13. A bearing comprising relatively moving bearing members in contact with one another and receiving the bearing pressure one from the other, one of said members comprising a flexibly connected plurality of relatively-rigid bearing segments, and a multiplicity of helical springs arranged to form a cushion affording said latter bearing member diffusely distributed elastically yielding support, so that said latter bearing member may give and take locally throughout its bearing surface.

14. A bearing comprising an annular flexible member having a bearing surface divided into relatively-rigid segments flexibly connected by said member, and a series of springs for supporting said flexible member and cooperating therewith in the automatic equalization of the pressure on said segments.

15. A bearing comprising an annular flexible member having a bearing surface divided into relatively-rigid segments flexibly connected by said member, and a series of springs for supporting said flexible member and permitting said segments to tilt when the bearing is in operation.

16. A bearing comprising an annular flexible member having a bearing surface divided into a plurality of bearing segments flexibly connected by said member and a plurality of elastic members corresponding in number to said segments for yieldably supporting said bearing member.

17. A bearing including a plurality of relatively-rigid bearing shoes unitarily connected by a flexible ring, and a plurality of resilient members on which said unitary bearing member is yieldably mounted.

In witness whereof, we have hereunto set our hands this 14th day of May, 1918.

ALBERT KINGSBURY.
HARRY A. S. HOWARTH.